United States Patent
Vandette et al.

(10) Patent No.: US 6,785,228 B1
(45) Date of Patent: Aug. 31, 2004

(54) SUBSCRIBER PERMISSIONS AND RESTRICTIONS FOR SWITCHED CONNECTIONS IN A COMMUNICATIONS NETWORK

(75) Inventors: Henri R. Vandette, Ottawa (CA); Steve Morin, Stittsdille (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/343,179

(22) Filed: Jun. 30, 1999

(51) Int. Cl.$^7$ ............................................... H04L 12/26
(52) U.S. Cl. .................. 370/230; 370/231; 370/395.43
(58) Field of Search .............................. 370/230, 231, 370/252, 389, 395, 43, 468, 469

(56) References Cited

U.S. PATENT DOCUMENTS

| | | | |
|---|---|---|---|
| 5,130,986 A | * | 7/1992 | Doshi et al. ................. 370/231 |
| 5,754,529 A | * | 5/1998 | Heiss .................... 370/395.43 |
| 5,937,343 A | * | 8/1999 | Leung ......................... 370/469 |
| 6,259,699 B1 | * | 7/2001 | Opalka et al. .............. 370/389 |
| 6,404,769 B1 | * | 6/2002 | Kapoor ....................... 370/252 |
| 2003/0039210 A1 | * | 2/2003 | Jin et al. .................... 370/229 |

OTHER PUBLICATIONS

"ATM User–Network Interface (UNI) Signalling Specification", Version 4.0, ATM Forum Technical Committee, Document No. af–sig–0061.000, Jul., 1996.

* cited by examiner

Primary Examiner—Salvatore Cangialosi
(74) Attorney, Agent, or Firm—Marks & Clerk

(57) ABSTRACT

A communications network which enables service providers to optionally place limitations on the switched connection requests that subscribers may place through the network. This is accomplished by enabling node administrators to configure, on a per subscriber basis, throughput and other connection limits for all incoming and outgoing switched connections a subscriber may attempt to establish or receive. The limits are checked by an edge network node when the call is requested and the call is accordingly established or refused.

18 Claims, 5 Drawing Sheets

---

SUBSCRIBER SVC THROUGHPUT LIMITATIONS

LIMITS FOR INCOMING CALLS: ENABLED

LIMITS FOR OUTGOING CALLS: ENABLED

| ATM | | FRAME RELAY | |
|---|---|---|---|
| MAX PIR: | NO LIMIT | MAX CIR: | 256KBPS |
| MAX SIR/MIR: | NO LIMIT | MAX BE: | 64 KBITS |
| MAX PIR FOR CBR: | NO LIMIT | MAX BC: | 128KBITS |
| MAX PIR FOR UBR: | NO LIMIT | DEF CIR: | 128KBPS |
| MAX MBS: | NO LIMIT | DEF BE: | 64 KBITS |
| | | DEF BC: | 64 KBITS |
| | | DEF SERVICE CATEGORY: | NRT VBR |

50

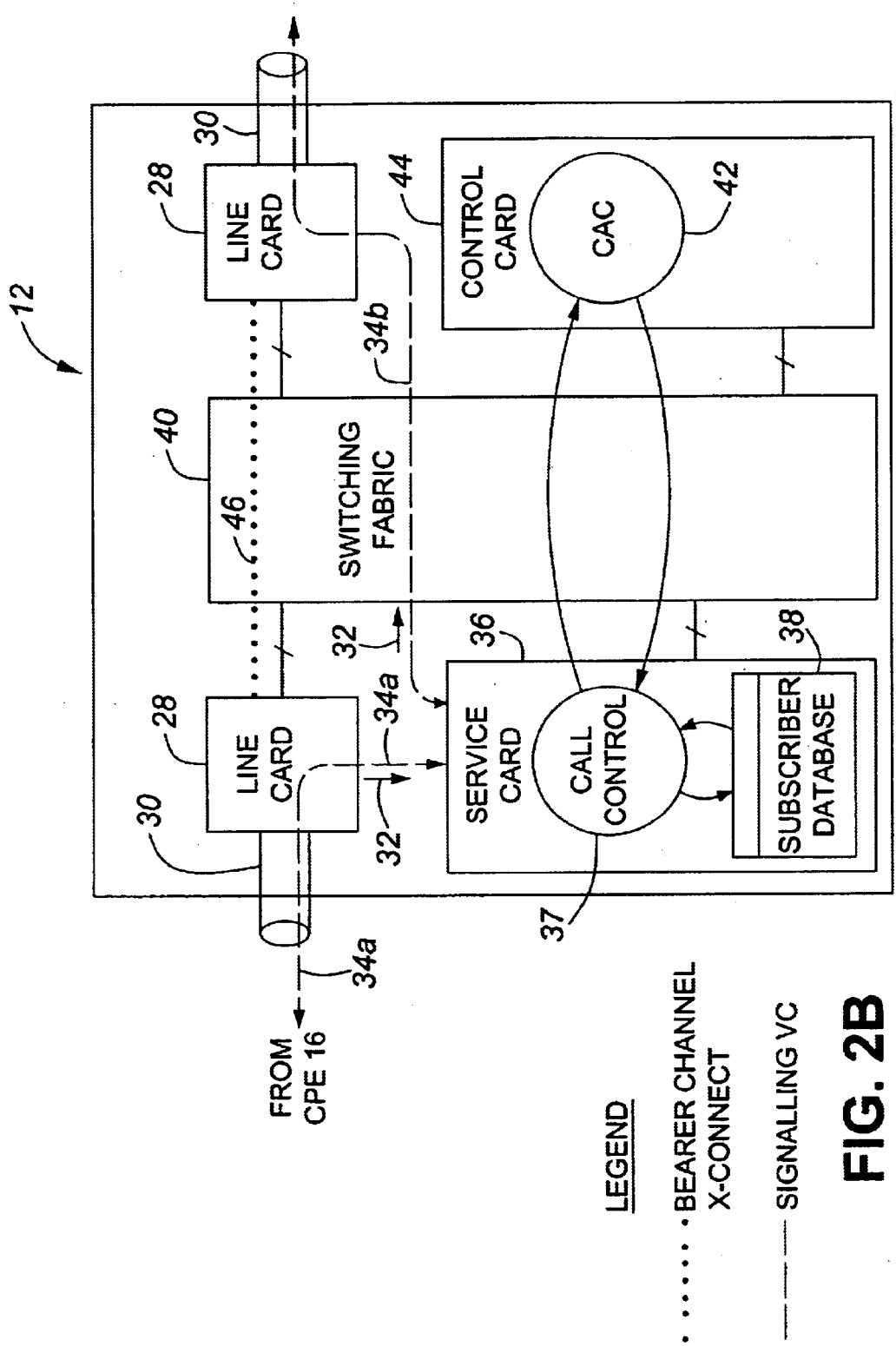

SUBSCRIBER SVC THROUGHPUT LIMITATIONS

LIMITS FOR INCOMING CALLS: ENABLED

LIMITS FOR OUTGOING CALLS: ENABLED

| ATM | | FRAME RELAY | |
|---|---|---|---|
| MAX PIR: | NO LIMIT | MAX CIR: | 256KBPS |
| MAX SIR/MIR: | NO LIMIT | MAX BE: | 64 KBITS |
| MAX PIR FOR CBR: | NO LIMIT | MAX BC: | 128KBITS |
| MAX PIR FOR UBR: | NO LIMIT | DEF CIR: | 128KBPS |
| MAX MBS: | NO LIMIT | DEF BE: | 64 KBITS |
| | | DEF BC: | 64 KBITS |
| | | DEF SERVICE CATEGORY: | NRT VBR |

FIG. 3

SUBSCRIBER SVC THROUGHPUT LIMITATIONS

| SERVICE CATEGORY | CBR | VBR | VBR | ABR | UBR |
|---|---|---|---|---|---|
| ACCEPT SVCS | Y | Y | Y | Y | Y |

FIG. 4

SUBSCRIBER PERMISSIONS AND RESTRICTIONS FOR SWITCHED CONNECTIONS IN A COMMUNICATIONS NETWORK

FIELD OF THE INVENTION

The invention generally relates to call control processing in a communications network and more specifically to a method and apparatus for implementing subscriber permissions and restrictions for switched connections in a digital communications network.

BACKGROUND OF INVENTION

Differing communication systems employ various methods for partitioning bandwidth amongst calls routed through a network. In asynchronous transfer mode (ATM) networks, for instance, when a switched connection such as a switched virtual circuit (SVC) is established the call set-up message carries a number of information elements (IEs) which specify various traffic and quality of service (QoS) parameters. This information is processed by call control software resident on each network node which determines the type or service category of the requested connection as well as the bandwidth required by the connection. The connection admission control (CAC) function of the node is then executed in order to determine whether the node has sufficient internal resources such as bandwidth and buffer space to support the requested call. If so, the node reserves internal bandwidth and buffer space for that connection and the call set-up message is progressed to the next node along the path of the switched connection.

Once the switched connection has been established, the ingress node (of the network) typically applies a usage parameter control (UPC) function to the connection in order to monitor and police it. More specifically, if the source or customer premise equipment (CPE) misbehaves by transmitting data packets at a rate or with a variability outside of the parameters that the connection was initially set up for, the network may then drop such data packets since they do not conform to the "traffic contract" which was established during call set up.

While the foregoing methodology is effective in policing misbehaving sources once the connection is established. it does not prevent a subscriber from requesting and establishing a switched connection which may require network resources greater than that which has been pre-agreed to via a business or legal arrangement between a subscriber and a network service provider. In other words, no mechanism exists for preventing a subscriber from establishing a switched connection in the first instance using a quantum of network resources beyond that which the subscriber has agreed to pay for.

There are many reasons why subscribers may request service outside of the parameters of a service agreement, including human error in equipment configuration, and wilful intent to defraud. Such erroneous connections, even ones innocently requesting inordinate amounts of bandwidth, are likely to be accepted by the network given the lack of a subscriber enforcement mechanism and the fact that network policies typically permit capacity to be overbooked, often by a 2:1 or 3:1 ratio. Nevertheless, despite such policies, these erroneously configured connections can have a deleterious effect, even if the subscriber equipment is not transmitting data beyond that provided for in the service agreement. This is because high bandwidth connections require large blocks of bandwidth to be reserved for the duration of the connection, independent of how the subscriber uses the available bandwidth. This may result in lost opportunity costs since new traffic may have to be refused if too many erroneous, bandwidth-excessive, connections are provisioned by the network.

SUMMARY OF THE INVENTION

The invention enables networking service providers to optionally place limitations on the switched connection requests that subscribers may place on a network. This is accomplished by enabling node administrators to configure, on a per subscriber basis, the throughput limits for all incoming and outgoing switched connections a subscriber may attempt to establish or receive.

One aspect of the invention relates to a method for establishing connections in a switched connection network. The method includes (a) provisioning throughput limitations in respect of network subscribers; (b) requesting the establishment of a switched connection call; (c) filtering the call based on the subscriber throughput limitations; and (d) establishing or refusing to establish the switched connection based on the outcome of the filtering step.

Another aspect of the invention relates to a method of establishing connections in a switched connection communications network. The method includes: (a) provisioning a throughput limitation database in respect of one or more subscribers to the network; (b) signaling a call set-up message in order to establish a switched connection associated with a given subscriber; (c) receiving the call set-up message at an edge network node associated with customer premise equipment of the given subscriber and comparing at least one throughput request provided by the call set-up message against at least one corresponding throughput limitation stored in the database with respect to the given subscriber; and (d) progressing the call set-up message or refusing to establish the switched connection based on the outcome of the comparison.

In the embodiments described herein, the throughput limitation database is stored on an edge network node which carries out the limit checking on a per subscriber basis.

BRIEF DESCRIPTION OF DRAWINGS

The foregoing and other aspects of the invention will become more apparent from the following description of an embodiment thereof and the accompanying drawings which illustrate, by way of example, the embodiment. In the drawings:

FIGS. 2A–2C are schematic diagrams showing the architecture of an edge network node and the processing functions carried out by it; and FIGS. 3 and 4 are diagrams of input screens for enabling node administrators to configure various throughput limitations.

DETAILED DESCRIPTION OF PREFERRED EMBODIMENTS

Figure 1:
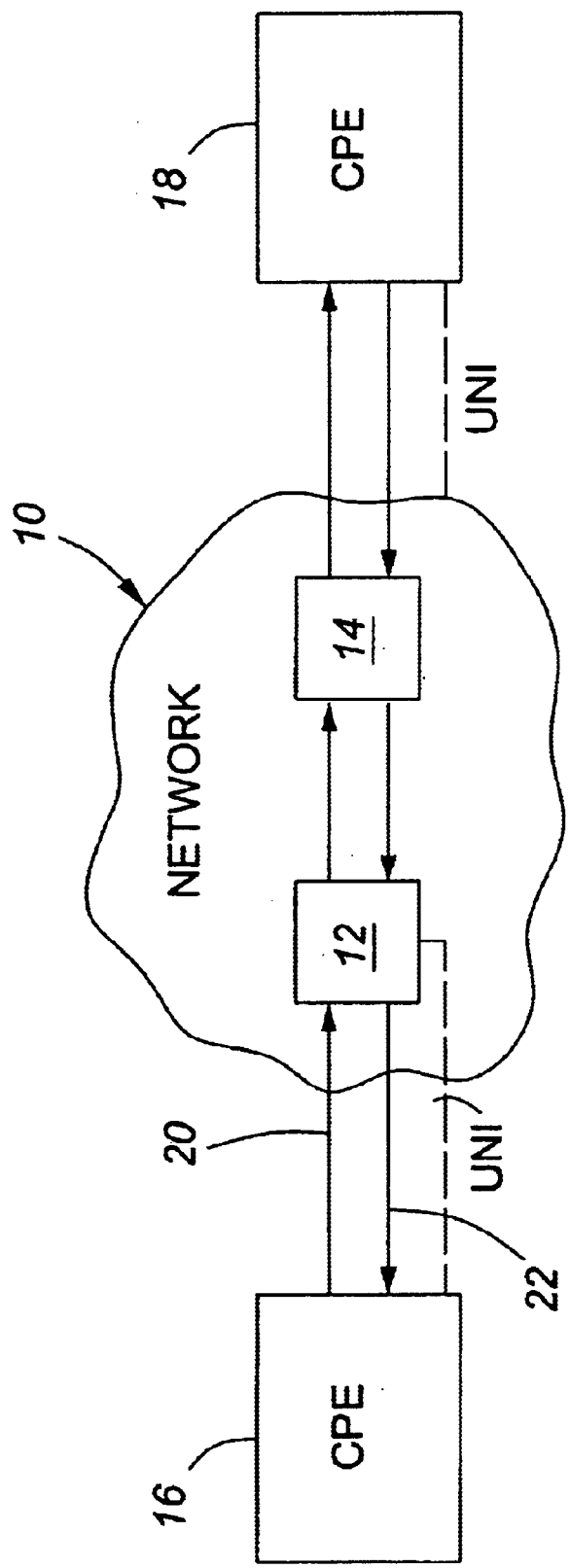
FIG. 1 is a schematic diagram of a reference network.

FIG. 1 shows a reference switched connection network 10 which includes edge network nodes 12 and 14. (For simplicity, and since the particular configuration of the network is not material to this description, the remaining network nodes are not shown.) The edge network nodes 12 and 14 are connected via conventional interface lines (not shown) to customer premise equipment (CPE) 16 and 18.

Generally speaking, calls in switched connection network 10 are dynamically established and cleared in substantially real time by the network in accordance with standard signalling protocols. In order to initiate an end-to-end call, a call originating device such as CPE 16 or 18 signals a "call set-up" message over a user-to-network interface (UNI) to an ingress node of network 10 indicating the destination address and desired, foe example, bandwidth and quality of service parameters. The ingress node decides whether or not to accept the call based on its internal resource availability. If the ingress node has sufficient resources it propagates the call set-up message to the next network node towards the destination address via known signalling and routing means. The call set-up message is thus steered through the network, and each node which receives the call set-up message establishes a bearer channel cross-connect (not shown). Ultimately, the call set-up message is relayed by the network to the terminating device at the destination address, and the terminating device is thus informed as to the identity of the bearer channel upon which data will be received or may be transmitted. Once the call set-up message is received at the terminating device, a "connect" message is signalled back to the call originating device. At this point (depending upon the particular signalling protocol employed) the call is deemed to have been established and the call originating device, as well as the terminating device in the event of a bidirectional connection, may transmit user data over the recently established bearer channel path.

For the purpose of this description, CPE 16 is associated with a first party (hereinafter "subscriber") who has entered into a service agreement or other business or legal arrangement with the provider of network services and CPE 18 is associated with a second party who may or may not privy to the same agreement as the first party.

CPE 16 may originate or receive calls to or from CPE 18, as shown by arrows 20 and 22. For switched calls, such as a switched virtual circuit (SVC), the path any given call assumes through the network is variable, depending on a variety of factors such as trunk availability, etc. However, every call and call set-up message originating from or destined for CPE 16 will pass through the associated edge node 12 since CPE 16 is physically connected thereto. Thus, when a call originates from CPE 16, the edge node 12 functions as a network ingress node; and when a call is destined for or terminates at CPE 16 the associated edge node 12 functions as a network egress node.

Figure 2A:
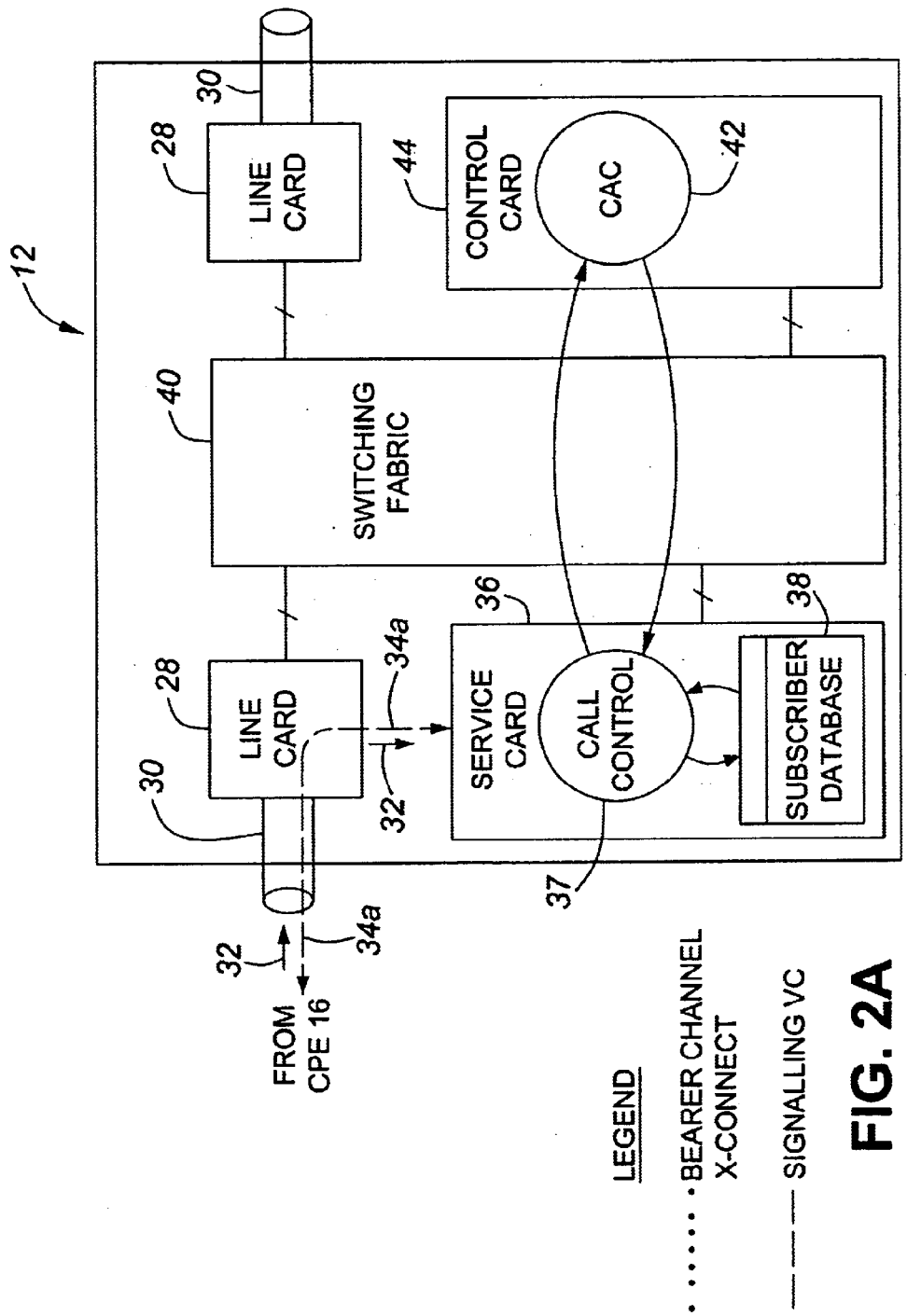
Figure 2C:
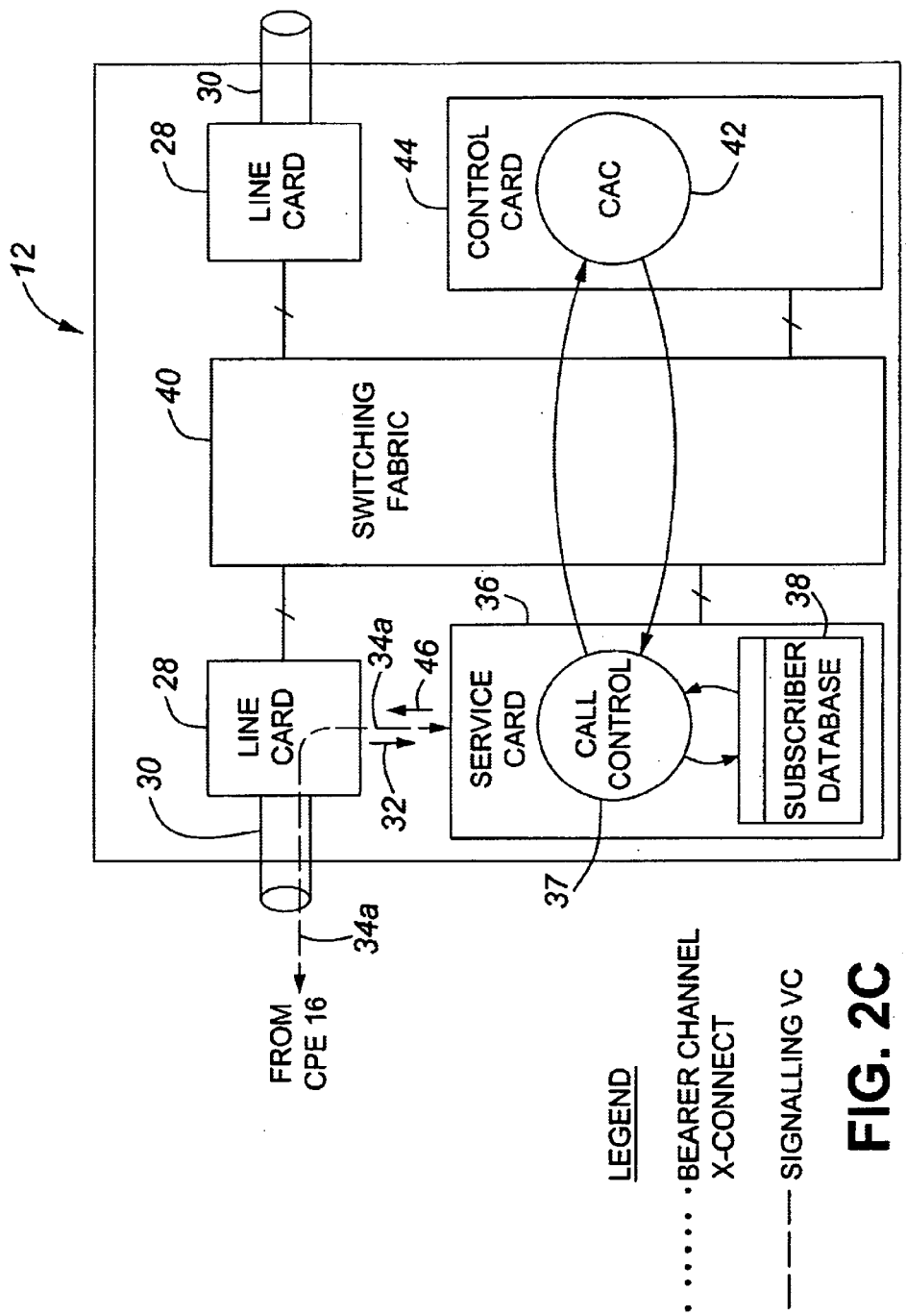

The service agreement between the network service provider and the subscriber at CPE 16 typically includes a number of throughput limitations, such as the maximum permissible bandwidth the subscriber may access per connection. Referring additionally to FIGS. 2A–2C, the throughput limitations for CPE 16 connected to edge node 12 are contained in a database 38 provisioned by the service provider. The database is preferably indexed by subscriber address, code or key in order to enable quick lookup of pertinent information on a per subscriber basis. Such a database may be configured via a node terminal interface or other known manner of configuring a network node. Other potential throughput limitations are discussed below with reference to ATM standards, but for the moment it should be appreciated that the subscriber may be subject to at least one throughput limitation, such as maximum permissible bandwidth.

As noted above, the call set-up message will pass through the edge network node 12 irrespective of whether subscriber CPE 16 originates or terminates a call. For purposes of description, however, CPE 16 is randomly selected to be the calling or originating party and CPE 18 the called or destination party. The processing which occurs at edge (or ingress) network node 12 in these circumstances is discussed with reference to FIGS. 2A–2C wherein node 12 is illustrated as a model 36170™ ATM switch or node commercially available from Newbridge Networks Corporation of Kanata, Ontario, Canada. As shown, node 12 includes line cards 28 which feature physical interface ports 30 for transmitting and receiving data packets to and from the network or customer premise equipment. The line cards 28 are connected to a switching fabric 40 which provides a means for transferring or copying packets between the line cards 28 and other cards or boards in the switch.

As shown in FIG. 2A, CPE 16 signals a call set-up message, schematically designated by arrow 32 which consists of a number of packets associated with a signalling VC 34a in accordance with a signalling plane of the communication protocol. The line cards 28 provide an interface function for forwarding the packets of the call set-up message 32 to an SVC service card 36. The SVC service card 36 terminates the signalling link between the node and CPE 16 and provides a call control function 37 for processing the call set-up message 32. More specifically, call control function 37 interprets traffic and quality of service parameters included in the call set-up message 32 and determines throughput demands, such as bandwidth, requested of the network by CPE 16. The call control function 37 then filters the call by consulting the subscriber throughput limitation database 38 in order to determine whether the throughput requests can be accommodated as per the service agreement between the subscriber at CPE 16 and the service provider.

If the throughput requests have not exceeded the corresponding throughput limitations, the edge node 12 then invokes a connection admission control (CAC) function 42 of control card 44 to determine whether the node or network has sufficient internal resources to support and establish the requested connection. If so, then as shown in FIG. 2B the edge node 12 establishes a bearer channel cross-connect 46 (schematically shown) between the input and output ports and progresses the call set-up message 32 over signalling VC 34b as per the communication protocol employed to the next node in the path of the call. (In the event the CPE 16 terminates the call the set-up message would be progressed to CPE 16 over the UNI therebetween.) However, if any of the throughput demands requested of the network exceed the corresponding threshold limitations, then the edge node 12 does not establish a bearer channel cross-connect or progress the call set-up message forward. Instead, depending on the particular signalling protocol employed, the edge node 12 as shown in FIG. 2C transmits a call release message 46 with a suitable failure code back to CPE 16 (or CPE 18 if it originated the call), or alternatively some other type or format of signalling message specifying failed call establishment. The same actions occur if the approval from the CAC function 42 is negative.

Note also that the edge node may invoke the CAC processing prior to filtering the call on a per subscriber basis. This is, however, less efficient than the order described above and hence less preferred.

In the alternative, the call set-up message 32 may be deficient in specifying some necessary parameters required to establish a connection. For instance, when frame relay service is provided over an ATM platform, the call set-up message of a frame relay SVC connection request may not specify the committed burst size for the connection. In this case, in addition to any committed burst size throughput limitation, the preferred embodiment provides a default committed burst size value per subscriber, and database 38 may be configured accordingly. In this manner, the connection may established based on unique default traffic parameters provided on a per subscriber basis.

The throughput limitations and default parameters provided by one embodiment of the invention is discussed next. In what follows, reference is made to an asynchronous transfer mode (ATM) network and to native ATM services, as well as frame relay (FR) services offered from an ATM platform, and the reader is referred to "ATM User-Network Interface (UNI) Signalling Specification, Version 4.0", doc. no. af-sig-0061.000, ATM Forum Technical Committee, July, 1996; "Network to Network FR/ATM Service Interworking Implementation Agreement", Frame Relay Forum doc. no. frftc.106r1, Jan. 13, 1997, all of which is incorporated herein, for further particulars of these standards.

FIG. 3 shows an input screen 50 employed in a node terminal interface program for configuring throughput limitations for a subscriber. The node administrator may enter throughput limitations for ATM service and/or frame relay service carried over an ATM platform. FIG. 4 shows an input screen 52 wherein the node administrator is able to configure which ATM service categories a subscriber may request when placing an outgoing call. The throughput limitations and related functionality are summarised below. In what follows the term "incoming call" means a call which originates from customer premise equipment directly connected to the node and the term outgoing call means a call which terminates at the customer premise equipment directly connected to the node.

Throughput Limitations

1. SVC Throughput Limit Provisioning for Frame Relay Over ATM

The throughput limit provisioning for FR over ATM is provided on a per subscriber basis. For the maximum allowed, parameters that follow, the maximum valid value is independent of the access rate of the physical interface that the subscriber is assigned to.

Maximum Allowed Committed Information Rate (Max CIR)

This selection allows the node administrator to assign the maximum committed information rate for frame relay SVCs.

Valid Values: From 0 to 2**30−1Kbps; and 'no limit'.
Default Value: 'no limit'
Conditions: If the limits for incoming or outgoing calls is enabled, then any incoming or outgoing call requesting an incoming or an outgoing committed information rate in excess of the configured maximum allowed value will be rejected with a cause code value of #49, which represents 'Quality of Service not available'. If 'no limit' is configured then no limit checking is done.

Maximum Allowed Excess Burst Size (Max Be)

This selection allows the node administrator to assign the maximum allowed excess burst size for frame relay SVCs.

Valid Values: From 0 to 2**30−1Kbits; and 'no limit'.
Default Value: 'no limit'
Conditions: If the limits for incoming or outgoing calls is enabled, then any incoming or outgoing call requesting an incoming or an outgoing excess burst size greater than the configured maximum allowed value will be rejected with a cause code value of #49, which represents 'Quality of Service not available'. If 'no limit' is configured then no limit checking is done.

Maximum Allowed Committed Burst Size (Max Bc)

This selection allows the node administrator to assign the maximum committed burst size for frame relay SVCs.

Valid Values: From 0 to 2**30−1Kbits; and 'no limit'.
Default Value: 'no limit'
Conditions: If the limits for incoming or outgoing calls is enabled, then any incoming or outgoing call requesting an incoming or an outgoing committed burst size in excess of the configured maximum allowed value will be rejected with a cause code value of #49, which represents 'Quality of Service not available'. If 'no limit' is configured then no limit checking is done.

Default Committed Information Rate (Def CIR)

This selection allows the node administrator to assign the default committed information rate for frame relay SVCs.

Valid Values: From 0 to 2**30−1Kbps
Default Value: 0 Kbps
Conditions: If the incoming FR SVC call does not explicitly request a specific committed information rate then the default CIR value is used as the requested CIR.

Default Excess Burst Size (Def Be)

This selection allows the node administrator to assign the default excess burst size for frame relay SVCs.

Valid Values: From 0 to 2**30−1Kbits
Default Value: 56 Kbits
Conditions: If the incoming FR SVC call does not explicitly request a specific excess burst size then the default Be is used as the requested Be.

Default Committed Burst Size (Def Bc)

This selection allows the node administrator to assign a default committed burst size for frame relay SVCs.

Valid Values: From 0 to 2**30−1Kbits
Default Value: 0 Kbits
Conditions: If the incoming FR SVC call does not explicitly request a specific committed burst size then the default Bc is used as the requested Bc.

Default Service Category

This selection allows the node administrator to assign the default ATM service category for frame relay SVCs.

Valid Values: 'nrt VBR', 'UBR' and 'ABR'.
Default Value: 'nrt VBR'. (nrt VBR is the default selected by the Frame Relay Forum for FR SVCs; see document frftc. 106r1, supra).
Conditions: Since FR SVC calls may not request a specific service category at call set-up time, the default service category is used for all incoming calls originating from the subscriber.

2. SVC Throughput Limit Provisioning for Native ATM

Maximum Allowed Peak Information Rate (Max PIR).

This selection allows the node administrator to assign the maximum peak information or data transmission rate for SVCs in the ABR, nrt-VBR and rt-VBR service categories. (The PIR limit corresponds to the PCR traffic descriptor parameter formally specified in the ATM standards.)

Valid Values: From 0 to 2**30−1Kbps; and 'no limit'.
Default Value: 'no limit'
Conditions: If the limit for incoming or outgoing calls is enabled, then any incoming or outgoing call requesting a forward or backward peak information or data transmission rate greater than the configured maximum allowed value will be rejected with a cause code value of #49, which represents 'Quality of Service not available'. If 'no limit' is configured then no limit checking is done. The PIR applies to the following ATM service categories: ABR, nrt-VBR and rt-VBR.

Maximum Allowed Sustained/Minimum Information Rate (Max SIR/MIR)

This selection allows the node administrator to assign the maximum allowed sustained or minimum information or data transmission rate for ATM SVCs in the rt-VBR, nrt-VBR and ABR service categories. (The SIR./MIR limit corresponds to the SCR and MCR parameters formally specified in the ATM standards.)

Valid Values: From 0 to 2**30–1Kbps; and 'no limit'.
    Default Value: 'no limit'
    Conditions: If the limits for incoming or outgoing calls is enabled, then any incoming or outgoing call requesting a forward or backward SIR or MIR in excess of the configured maximum allowed value will be rejected with a cause code value of #49, which represents Quality of Service not available. If 'no limit' is configured then no limit checking is done. The SIR/MIR applies to the following service categories: rt-VBR (SIR), nrt-VBR(SIR) and ABR(MIR).

Maximum Allowed Peak Information Rate for CBR (Max PIR for CBR)

This selection allows the node administrator to assign the maximum allowed peak information or data transmission rate (corresponding to the PCR parameter) for ATM SVCs requesting a service category of CBR.

Valid Values: From 0 to 2**30–1Kbps; and 'no limit'.
    Default Value: 'no limit'
    Conditions: If the limits for incoming or outgoing calls is enabled, then any incoming or outgoing call requesting a forward or backward PIR for CBR in excess of the configured maximum allowed value will be rejected with a cause code value of #49, which represents 'Quality of Service not available'. If 'no limit' is configured then no limit checking is done. This limit only applies to ATM SVCs requesting a CBR service category.

Maximum Allowed Peak Information Rate for UBR (Max PIR for UBR)

This selection allows the node administrator to assign the maximum allowed PIR (corresponding to the PCR parameter) for ATM SVCs requesting a service category of UBR.

Valid Values: From 0 to 2**30–1Kbps; and 'no limit'.
    Default Value: 'no limit'
    Conditions: If the limit for incoming or outgoing calls is enabled, then any incoming or outgoing call requesting a forward or backward PIR for UBR in excess of the configured maximum allowed value will be rejected with a cause code value of #49, which represents 'Quality of Service not available'. If 'no limit' is configured then no limit checking is done. This limit only applies to ATM SVCs requesting a UBR service category.

Maximum Allowed Maximum Burst Size (Max MBS)

This selection allows the node administrator to assign the MBS for ATM SVCs in the rt VBR or nrt VBR service categories.

Valid Values: An integer value or 'no limit'.
    Default Value: 'no limit'
    Conditions: If the limit for incoming or outgoing calls is enabled, then any incoming or outgoing call requesting a forward or backward MBS in excess of the configured maximum allowed value will be rejected with a cause code value of #49, which represents 'Quality of Service not available'. If 'no limit' is configured then no limit checking is done. This limit only applies to ATM SVCs requesting a rt VBR or a nrt VBR service category.

3. Limits Administration

Limits for Incoming Calls

This selection allows the node administrator to enable or disable the verification that incoming calls are requesting throughput that falls within the configured throughput limits.

Valid Values: 'Enabled' or 'Disabled' (Boolean values)
    Default Value: 'Disabled'
    Conditions: Limit checking is carried out on incoming calls only when this parameter is enabled; otherwise no checks on incoming calls are carried out.

Limits for Outgoing Calls

This selection allows the node administrator to enable or disable the verification that outgoing calls are requesting throughput that falls within the configured limits.

Valid Values: 'Enabled' or 'Disabled' (Boolean values)
    Default Value: 'Disabled'
    Conditions: Limit checking on outgoing calls is carried out only when this parameter is enabled; otherwise no checks on outgoing calls are carried out.

As shown, these limits are invoked on a global basis in that all previously described incoming or outgoing limits are checked or not. However, the enablement/disablement mechanism may be implemented on a per limitation basis, if desired.

4. SVC Permission Based on Requested Service Category

These selections. as shown in FIG. 4, allow the node administrator to accept or reject SVCs based solely on the requested service category of the call. All five service categories CBR, rt VBR, nrt VBR, ABR and UBR are individually configurable. This throughput limitation applies only to incoming calls.

Valid Values: 'Y' or 'N'.
    Default Value: 'Y' (meaning accept the call)
    Conditions: If the 'accept SVCs based on requested service category' limitation is 'N' for a given service category and a call originates from the subscriber requesting the given service category, the call will be rejected with a cause code value of #57 which represents 'Bearer capability not authorized'.

For ease of reference, the following table 1 illustrates the concordance or relationship between the foregoing ATM throughput limits and service categories.

TABLE 1

| Service Category | PIR Support | SIR/MIR Support | MBS Support | PIR for CBR | PIR for UBR |
|---|---|---|---|---|---|
| ABR | Yes | Yes(MIR) | n/a | n/a | n/a |
| nrt VBR | Yes | Yes(SIR) | Yes | n/a | n/a |
| rt VBR | Yes | Yes(SIR) | Yes | n/a | n/a |
| CBR | n/a | n/a | n/a | Yes | n/a |
| UBR | n/a | n/a | n/a | n/a | Yes |

In the foregoing, the throughput limitations are specifiable on a per subscriber/per connection basis. That is, each time the subscriber attempts to originate or terminate a switched connection the limit checking, if enabled, is performed for that particular connection. however, in alternative or additional embodiments the throughput limitations may be cumulative per subscriber. In such an embodiment the edge node 12 maintains throughput limitation accumulators for each subscriber. Thus. for instance, if a particular subscriber has a cumulative PCR limitation of 10 Mbs, then in circumstances where the subscriber has established connections reserving 9 Mbs and is requesting an additional connection requiring 2 Mbs, the new connection would be refused. Similarly other modifications and variations may be made to the preferred embodiment without departing from the spirit of the invention.

What is claimed is:

1. A method of implementing subscriber-based controls on connections in a switched connection network, comprising:
   (a) provisioning a throughput limitation in respect of a subscriber to the network, the throughput limitation being included in a service agreement between the subscriber and a service provider;
   (b) requesting the establishment of a switched connection call involving the subscriber;
   (c) filtering the call based on the throughput limitation associated with the subscriber; and
   (d) establishing or refusing to establish the call based on the outcome of the filtering step.

2. A method of implementing subscriber-based controls on connections in a switched connection communications network, comprising:
   (a) provisioning a throughput limitation database in respect of one or more subscribers to the network, the throughput limitation database storing throughput limitations included in a service agreement between the one or more subscribers and a service provider;
   (b) signaling a call set-up message in order to establish a switched connection associated with a given subscriber;
   (c) receiving the call set-up message at an edge network node associated with customer premise equipment of the given subscriber and comparing at least one throughput request provided by the call set-up message against at least one corresponding throughput limitation stored in the database with respect to the given subscriber; and
   (d) progressing the call set-up message or refusing to establish the switched connection based on the outcome of the comparison.

3. The method according to claim 2, including checking the availability of resources within the edge network node to support the connection prior to progressing the call set-up message, and refusing to establish the connection in the event of insufficient resources.

4. The method according to claim 3, including transmitting a call set-up failure message to an originator of the call set-up message in the event the switched connection is not permitted to be established.

5. The method according to claim 2, including selectively enabling throughput limitations in respect of connections originating from or terminating at the subscriber customer premise equipment.

6. The method according to claim 2, wherein the communication network employs an ATM protocol, and the throughput requests and corresponding throughput limitations are selected from the group of traffic parameters comprising:
   (a) peak information rate for any appropriate service category;
   (b) burst size for any appropriate service category;
   (c) sustained information rate for any appropriate service category;
   (d) minimum information rate for any appropriate service category.

7. The method according to claim 2, wherein the communication network permits frame relay switched connections, and the throughput requests and corresponding limitations are selected from the group of traffic parameters comprising:
   (a) committed information rate;
   (b) excess burst size; and
   (c) committed burst size.

8. The method according to claim 6, wherein a throughput request and limitation comprises an ATM category of service.

9. The method according to claim 2, wherein the database is stored on the edge network node.

10. The method according to claim 2, wherein the throughput limitation applies to each call made and/or received by the subscriber.

11. The method according to claim 2, wherein the throughput limitation is cumulative upon all existing or attempted calls made and/or received by the subscriber.

12. A network node in a switched connection network, comprising:
    a throughput limitation database in respect of one or more subscribers to the network, the throughput limitation database storing throughput limitations included in a service agreement between the one or more subscribers and a service provider; and
    processing means for receiving a switched connection call set-up message associated with customer premise equipment of a given network subscriber and comparing at least one throughput request incorporated in the call set-up message against at least one corresponding throughput limitation stored in the database with respect to the given subscriber, and in response to said comparison progressing the call set-up message or refusing to establish the call.

13. The node according to claim 12, wherein the processing means is operative to check the availability of internal resources to support the connection prior to progressing the call set-up message, and refusing to establish the connection in the event of insufficient resources.

14. The node according to claim 13, wherein the processing means is operative to transmit a call set-up failure message to an originator of the call set-up message in the event the call is not permitted to be established.

15. The node according to claim 12, wherein the processing means includes means for selectively enabling throughput limitations in respect of connections originating from or terminating at the subscriber customer premise equipment.

16. The node according to claim 12, wherein the processing means executes an ATM communications protocol, and the throughput requests and corresponding throughput limitations are selected from the group of traffic parameters comprising:
    (a) peak information rate for any appropriate service category;
    (b) burst size for any appropriate service category;
    (c) sustained information rate for any appropriate service category;
    (d) minimum information rate for any appropriate service category.

17. The node according to claim 12, wherein the processing means is operative to permit frame relay switched connections, and the throughput requests and corresponding limitations are selected from the group of traffic parameters comprising:
    (a) committed information rate;
    (b) excess burst size; and
    (c) committed burst size.

18. The node according to claim 16, wherein a throughput request and limitation comprises an ATM category of service.

* * * * *